(12) United States Patent
Kim

(10) Patent No.: US 8,368,805 B2
(45) Date of Patent: Feb. 5, 2013

(54) USER INTERFACE MODULE FOR DIGITAL CAMERA AND DIGITAL CAMERA INCLUDING THE SAME

(75) Inventor: Yong-bum Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 453 days.

(21) Appl. No.: 12/501,563

(22) Filed: Jul. 13, 2009

(65) Prior Publication Data

US 2010/0079663 A1    Apr. 1, 2010

(30) Foreign Application Priority Data

Oct. 1, 2008    (KR) .......................... 10-2008-0096708

(51) Int. Cl.
*H04N 5/225* (2006.01)
*G06F 3/041* (2006.01)

(52) U.S. Cl. ........ 348/373; 348/374; 348/375; 348/376; 345/173

(58) Field of Classification Search .......................... None
See application file for complete search history.

(56) References Cited

U.S. PATENT DOCUMENTS

| | | | |
|---|---|---|---|
| 6,760,074 B1 * | 7/2004 | Maruyama et al. ........... | 348/375 |
| 7,656,675 B2 * | 2/2010 | Kim et al. ...................... | 361/752 |
| 7,672,993 B2 * | 3/2010 | Creemer et al. .............. | 709/203 |
| 2003/0048598 A1 * | 3/2003 | Lee et al. ...................... | 361/681 |
| 2009/0116202 A1 * | 5/2009 | Kim et al. ...................... | 361/752 |
| 2009/0117944 A1 * | 5/2009 | Lee et al. ...................... | 455/566 |
| 2009/0135150 A1 * | 5/2009 | Takashima et al. ........... | 345/173 |
| 2010/0091178 A1 * | 4/2010 | Eromaki et al. .............. | 348/373 |
| 2010/0211653 A1 * | 8/2010 | Creemer et al. .............. | 709/219 |

* cited by examiner

*Primary Examiner* — Lin Ye
*Assistant Examiner* — John H Morehead, III
(74) *Attorney, Agent, or Firm* — Drinker Biddle & Reath LLP

(57) ABSTRACT

A digital camera and a user interface module of the digital camera that includes: a front cover which includes a window onto which an image is projected; a touch panel which is disposed at the back of the front cover, and outputs an image on the window while detecting touch manipulations of a user; a button assembly which includes a button pattern that is externally exposed along with the front cover, and detects and converts manipulations of the button pattern into an electric signal; and a first wiring cable which collects and transmits a touch signal generated in the touch panel and a manipulation signal generated in the button assembly to the camera body. The user interface module may be assembled to the camera body as a unit module to form the camera and may have a single wire cable electrically connecting the user interface module to the camera body.

10 Claims, 3 Drawing Sheets

USER INTERFACE MODULE FOR DIGITAL CAMERA AND DIGITAL CAMERA INCLUDING THE SAME

CROSS-REFERENCE TO RELATED PATENT APPLICATION

This application claims the benefit of Korean Patent Application No. 10-2008-0096708, filed on Oct. 1, 2008, in the Korean Intellectual Property Office, the entire contents of which is incorporated herein by reference.

BACKGROUND

1. Field of the Invention

The disclosed interface module and digital camera relate to a user interface module of a digital camera, and more particularly, to a user interface module, wherein assembly productivity is improved by modularizing an image display unit for realizing a predetermined image, and a user manipulation unit as unified one part, and maintenance performance is improved by performing replacement and repair on module units, and a digital camera including the user interface module.

2. Description of the Related Art

A conventional digital camera includes a camera body in which a plurality of individual parts are interconnected with each other and combined as one body, and a case, which covers the camera body and defines an external appearance of the conventional digital camera. The individual parts forming the camera body are individually assembled. When a malfunctioning part is found during a reliability test of the digital camera, the part found to be malfunctioning is individually replaced or repaired.

For example, when a liquid crystal display (LCD) panel or a button for a user is malfunctioning, the LCD panel or the button must first be separated from the main body and then replaced or repaired. However, since the parts of the digital camera are combined into one body, a part may be damaged when separated from the digital camera. Additionally, connections with peripheral parts may be damaged, or peripheral parts may be affected or damaged during separation. Also, since the interconnections are formed between individual parts, a signal transmission system may become complicated, and accordingly, operation stability may deteriorate.

SUMMARY OF THE INVENTION

The present invention provides a digital camera in which assembly productivity of the digital camera is improved by modularizing an image display unit and a user manipulation unit as individuals parts, and maintenance performance is improved by performing replacement and repair on module units.

The present invention also provides a digital camera in which operation stability is improved by simplifying a signal transmission system between modularized parts and a camera body.

According to an aspect of the present invention, there is provided a user interface module of a digital camera, wherein the user interface module is assembled to a camera body as a unit module to form a camera, the user interface module including: a front cover which comprises a window onto which an image is projected; a touch panel which is disposed at the back of the front cover, and outputs an image on the window while detecting touch manipulations of a user; a button assembly which includes a button pattern that is externally exposed along with the front cover, and detects and converts manipulations of the button pattern into an electric signal; and a first wiring cable which collects and transmits a touch signal generated in the touch panel and a manipulation signal generated in the button assembly to the camera body.

A transparent window panel, which covers the window of the front cover, may be disposed between the front cover and the touch panel. The button assembly may be attached to one edge portion of the window panel with an adhesive film.

The button assembly may include a flexible printed circuit board which converts physical manipulations of the button pattern into an electric signal. The first wiring cable may be connected between the flexible printed circuit board and the camera body.

A second wiring cable for relaying a touch signal may be connected between the flexible printed circuit board and the touch panel.

The flexible printed circuit board may include a circuit configuration for converting or processing a touch signal generated in the touch panel.

The button assembly may further include a rubber mold for elastically biasing the button pattern toward the user. The button assembly may further include a pair of a front holder plate and a rear holder plate which are combined to each other while interposing the button pattern and the rubber mold between the front holder plate and the rear holder plate.

According to another aspect of the present invention, there is provided a digital camera including: a camera body which is configured to capture an image of a subject and generate data of the image; and a user interface module which is assembled to the camera body as unit module to form a camera, wherein the user interface module includes: a front cover which defines an external appearance of the digital camera and comprises a window onto which an image is projected; a touch panel which is disposed at the back of the front cover, and outputs an image on the window while detecting touch manipulations of a user; a button assembly which includes a button pattern that is externally exposed along with the front cover, and detects and converts manipulations of the button pattern into an electric signal; and a first wiring cable which collects and transmits a touch signal generated in the touch panel and a manipulation signal generated in the button assembly to the camera body.

The button assembly may include: a rubber mold which elastically biases the button pattern toward the user; a flexible printed circuit board which converts physical manipulations of the button pattern into an electric signal; and a pair of a front holder plate and a rear holder plate, which are combined with each other while interposing the button pattern, the rubber mold, and the flexible printed circuit board between the front holder and the rear holder plate.

The flexible printed circuit board and the camera body may be connected via the first wiring cable, and the flexible printed circuit board and the touch panel may be connected via a second wiring cable for relaying a touch signal.

A transparent window panel for covering the window of the front cover may be interposed between the front cover and the touch panel. The button assembly may be attached to one edge portion of the window panel with an adhesive film.

BRIEF DESCRIPTION OF THE DRAWINGS

The above and other features and advantages of the disclosed interface module and digital camera will become more apparent by describing in detail exemplary embodiments thereof with reference to the attached drawings in which.

DETAILED DESCRIPTION

Hereinafter, the disclosed interface module and digital camera will be described more fully with reference to the accompanying drawings, in which exemplary embodiments are shown.

Figure 1:
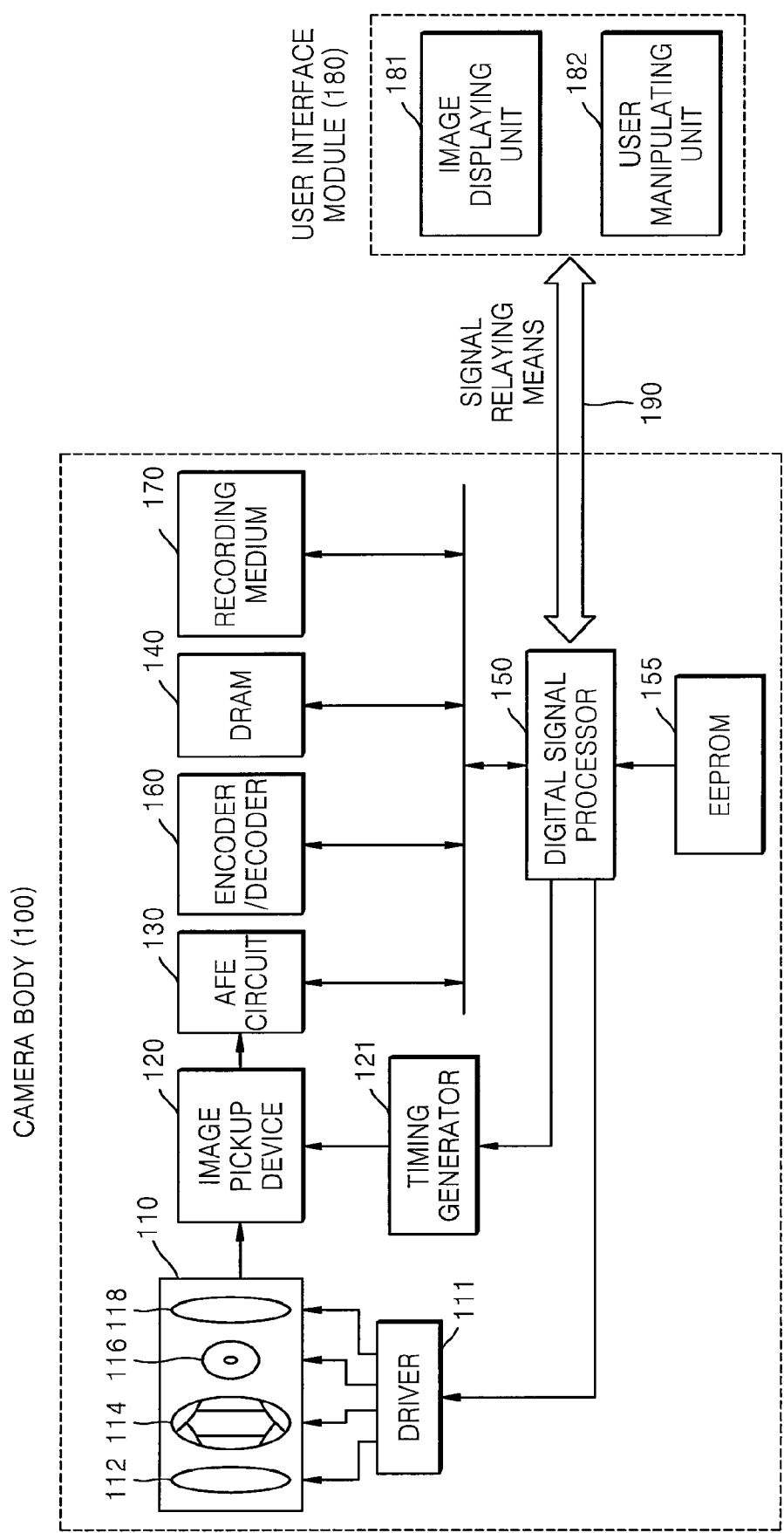
FIG. 1 is a block diagram schematically illustrating an example of a digital camera.

FIG. 1 is a block diagram schematically illustrating an example of a digital camera. Referring to FIG. 1, the digital camera includes a camera body 100, which captures an image of a subject and records the image as image data, and a user interface module 180, which is connected to the camera body via a signal relaying means 190.

The camera body 100 includes an optical unit 110, which includes a plurality of optical lenses so as to form the image of the subject on an image pickup surface, an image pickup device 120, which converts the image via the optical unit 110 into an electric image signal, an analog front end (AFE) circuit 130, which processes and converts an output signal of the image pickup device 120 into a quantized digital image signal, a dynamic random access memory (DRAM) 140, which temporarily stores an image signal so as to provide an operation domain for signal process, a recording medium 170, which stores the image data in a static image or moving image file form, and a digital signal processor 150, which controls overall data flow and each element of the camera body 100.

The optical unit 110 includes a zoom lens 112, which changes a focus distance by moving back and forth along an optical axis direction, a shutter 114 and an iris 116, which adjusts a light exposing time and an amount of incident light of the image pickup device 120, and a focus lens 118, which adjusts a focus of the image formed on the image pickup device 120. The zoom lens 112, the shutter 114, the iris 116, and the focus lens 118 are driven by an actuating motor (not shown) controlled by a driver 111.

The image pickup device 120 may be a charged coupled device (CCD) or complementary metal oxide semiconductor (CMOS) image sensor, and converts an image of a subject, which is incident via the optical unit 110, into an electric image signal. The image pickup device 120 may be controlled by the digital signal processor 150 via a timing generator (TG) 121.

The AFE circuit 130 converts an analog image signal output from the image pickup device 120 into a digital image signal by performing sample hold using a correlated double sampling (CDS) method in order to maintain a high signal to noise ratio, controlling a gain of an image signal via auto gain control, and performing an analog digital conversion (ADC) process.

An image quality compensation process and a luminance (Y)/chrominance (C) conversion process are selectively performed on the digital image signal quantized in the AFE circuit 130, and then the digital image signal is transmitted to an encoder/decoder 160 to be converted to encoded data according to a prescribed encoding method, such as joint photographic expert group (JPEG) or moving picture expert group (MPEG). Then, the encoded data is stored in the recording medium 170. The encoder/decoder 160 calls and extension decodes an image file stored in the recording medium 170 so as to reproduce a static image or a moving image Meanwhile, the DRAM 140 (or SDRAM) temporarily stores an image signal so as to provide an operation domain for the encoder/decoder 160 to perform a compression process and for the digital signal processor 150 to perform various data processes. The digital signal processor 150 controls each element of the camera body 100 by executing a program recorded in an electronically erasable and programmable ROM (EEPROM) 155, and performs various processes.

Meanwhile, the user interface module 180 is modularized as an individual part separated from the camera body 100, and the signal relaying means 190, such as a wiring cable, is interposed between the user interface module 180 and the camera body 100 so as to relay a signal between the user interface module 180 and the camera body 100. The user interface module 180 mainly includes an image display unit 181 and a user manipulation unit 182. The image display unit 181 may include a screen for reproducing a static image or a moving image that is stored in the recording medium 170 or display various menu screens by receiving and displaying an image signal from the digital signal processor 150 on a screen. For example, the image display unit 181 may be a touch panel which includes a displaying function and a function of detecting a user input in a form of a touch signal. The user manipulation unit 182 includes a plurality of buttons used for user manipulation, and converts user manipulation into a suitable electric signal and transmits the electric signal to the digital signal processor 150.

Figure 2:
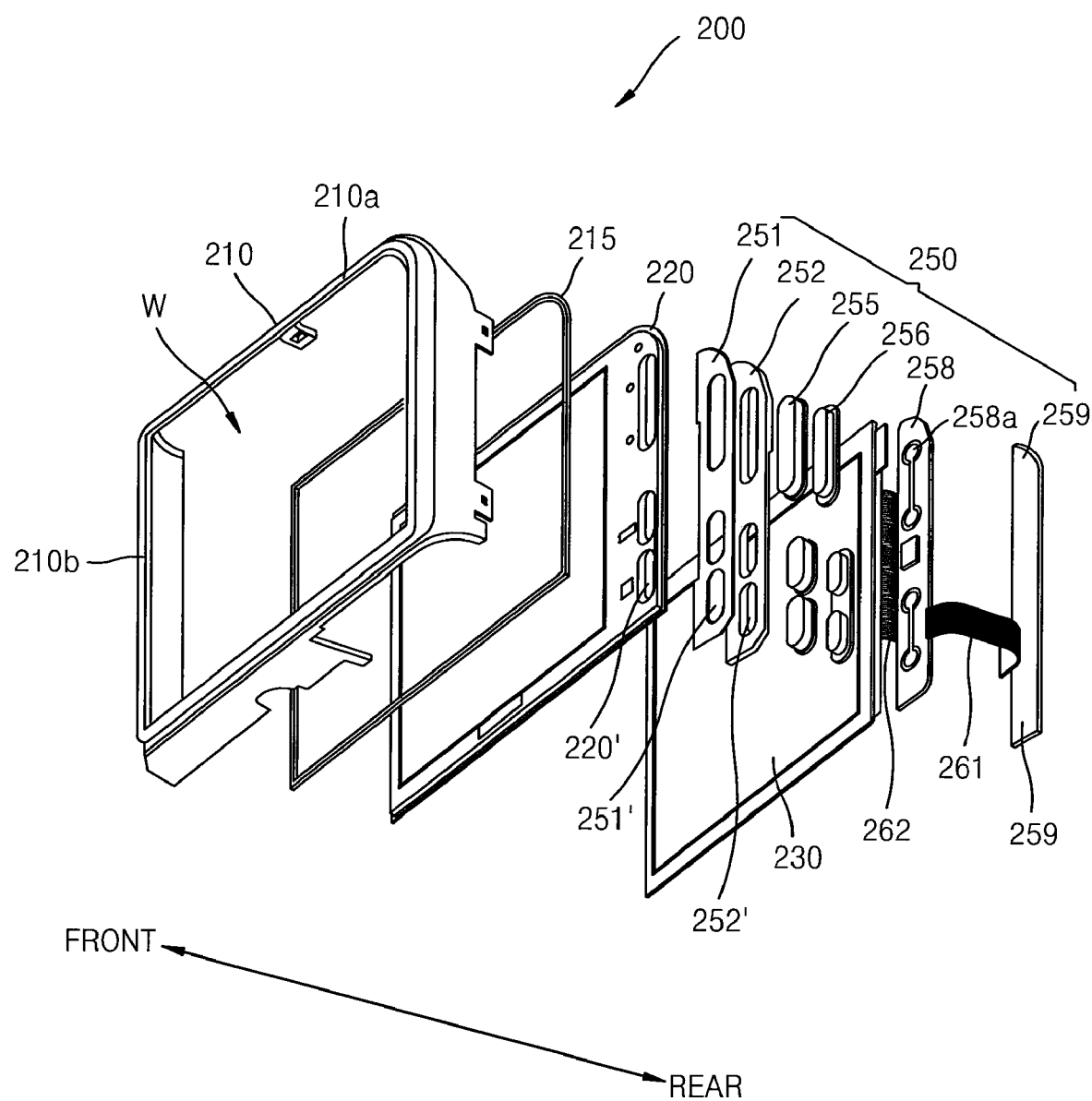
FIG. 2 is an exploded perspective view of an example of an user interface module.

FIG. 2 is an exploded perspective view of an example of an user interface module 200. In the disclosed user interface module 200, the front is a direction where a live-view screen, a reproduction screen, or various menu screens are displayed, and during photographing, a direction toward a photographer is the front and a direction toward a subject is the rear. The user interface module 200 includes a front cover 210, which defines a front external appearance of a digital camera, a window panel 220, which is connected to the back of the front cover 210, and a touch panel 230, which is connected to the back of the window panel 220. Also, a button assembly 250 for detecting a manipulation input of a user is prepared on an edge of the user interface module 200.

The front cover 210 defines the front external appearance of the digital camera, and includes long sides 210a that are parallel to each other, and short sides 210b that extend perpendicular to the long sides 210a and connect the long sides 210a. The front cover 210 may have a frame form surrounding a window W that is substantially rectangular. The front cover 210 may be formed of aluminum or a polymer resin.

The window panel 220 attached to the back of the front cover 210 covers the window W formed in the center of the front cover 210 so as to protect internal elements of the digital camera. The window panel 220 may be connected to the front cover 210 with an adhesive tape 215 that is attached along the edges of the window panel 220. The adhesive tape 215 is adhesive on both sides, thereby connecting the front cover 210 and the window panel 220 when the adhesive tape 215 is place between the front cover 210 and the window panel 220. The window panel 220 may be formed of an optically transparent polymer material, such as glass or polyethylene terephthalate (PET) having a sheet form. The window panel 220 may include a first opening 220' for exposing a button pattern 255 to the front. The button pattern 255 is assembled on the back of the window panel 220 and is disposed on one edge portion of the window panel 220. The button pattern 255 is externally exposed through the first opening 220', and can be manipulated by a user.

The touch panel 230 disposed at the back of the window panel 220 is an image display unit that receives an image signal from a camera body and realizes a predetermined image. The touch panel 230 displays a reproduction of a static image or a moving image that is stored in a recording medium or displays various menu screens. The touch panel 230 includes a displaying function and may provide a user interface function with a touch screen method. The touch panel 230 may receive an input of a user as the user touches a location of each selection item on a menu screen displayed on the touch panel 230. The touch panel 230 is configured to convert a location touched by the user into an electric signal, and transmit the electric signal to the camera body so that the digital camera performs a corresponding operation or sets a corresponding mode. Although the touch panel 230 is not illustrated in detail, the touch panel 230 may include a touch screen, which detects a user touch and is attached to a surface of a liquid crystal display (LCD) panel for performing a displaying function.

The button assembly 250 that is formed on one edge portion of the user interface module 200 includes the button pattern 255, which is contacted by the user, a rubber mold 256, which elastically biases the button pattern 255 toward the front, and a front holder plate 252 and a rear holder plate 259, which are connected to each other by interposing the button pattern 255 and the rubber mold 256 between the front and rear holder plates 252 and 259. The front holder plate 252 includes a second opening 252', which has the identical form as the button pattern 255 in order to expose the button pattern 255 that is assembled at the back of the front holder plate 252 to the front. An adhesive film 251 is interposed between the front holder plate 252 and the window panel 220 so as to attach the entire button assembly 250 to the window panel 220. The adhesive film 251 may include a third opening 251' for externally exposing the button pattern 255 that penetrates the front holder plate 252.

The rear holder plate 259 structurally supports the button pattern 255 with respect to manipulation pressure of the user, protects internal elements of the button assembly 250, and electrically insulates the button assembly 250 from the surroundings. A flexible printed circuit board (FPCB) 258, which converts physical manipulations of the user via button manipulations into a suitable electric signal, may be disposed in front of the rear holder plate 259. For example, a contact switch 258a may be disposed on a location of the FPCB 258 corresponding to the button pattern 255, and a wiring pattern (not shown) for externally relaying an electric signal generated in the contact switch 258a may be prepared on the FPCB 258. A first wiring cable 261 for relaying a signal to the camera body may be connected to the FPCB 258. One end of the first wiring cable 261 is connected to the FPCB 258 and another end of the first wiring cable 261 is connected to the camera body, and thus a user's manipulation signal that is generated in the FPCB 258 may be transmitted to the camera body. While assembling the front holder plate 252 and the rear holder plate 259, the first wiring cable 261 may be connected to the camera body through a minute slit between the front and rear holder plates 252 and 259. The first wiring cable 261 may be a flexible printed circuit, and although not illustrated in detail, the first wiring cable 261 may have a structure wherein a plurality of conductive patterns for electric signal communication, and a protective film for externally insulating the conductive patterns are stacked on one another.

Additionally, the FPCB 258 and the touch panel 230 that are disposed besides each other are electrically connected via a second wiring cable 262 that is disposed between the FPCB 258 and the touch pattern 230. A user's touch signal detected in the touch panel 230 is transmitted to the FPCB 258 via the second wiring cable 262, passes through the wiring pattern on the FPCB 258, and then is transmitted to the camera body via the first wiring cable 261. Here, the FPCB 258 may have circuit configuration for converting or processing an electric signal received from the touch panel 230. The converted electric signal may be transmitted to the camera body via the first wiring cable 261. By transmitting the touch signal generated in the touch panel 230 and a manipulation signal generated in the button assembly 250 to the camera body via the same signal relaying means, i.e., the first wiring cable 261, a signal transmission system is simplified and signal transmission is stabilized via a simplified structure. Also, the entire structure of the digital camera may be simplified by processing the touch signal and the manipulation signal together in the circuit configuration of the FPCB 258. An image signal generated in the camera body may be transmitted to the touch panel 230 via the first and second wiring cables 261 and 262, and a suitable screen is displayed on the touch panel 230 according to the received image signal.

Figure 3:
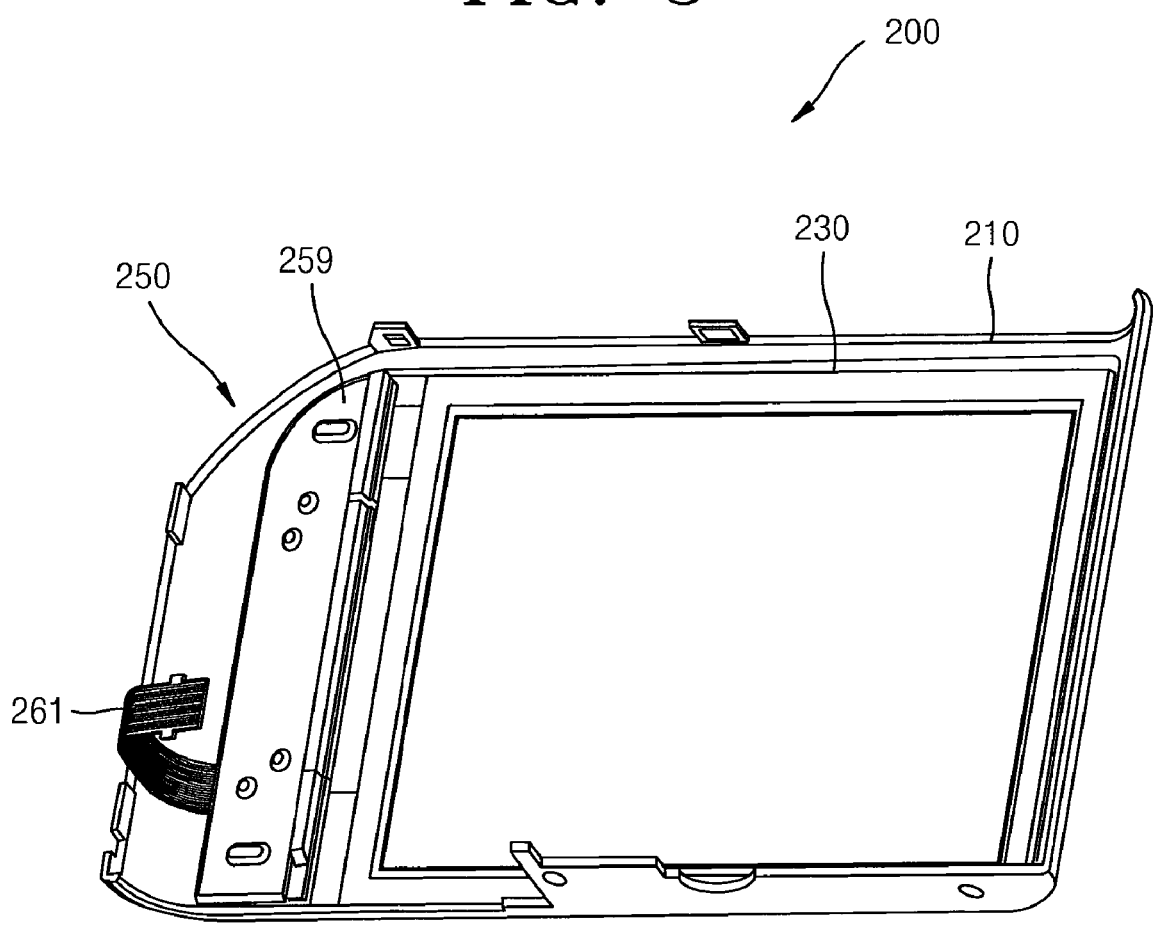
FIG. 3 is a diagram of the assembled user interface module illustrated in FIG. 2.

FIG. 3 is a diagram of the assembled user interface module 200 illustrated in FIG. 2. As illustrated in FIG. 3, the touch panel 230 is connected to the front cover 210 so as to cover the window prepared in the center of the front cover 210. The button assembly 250 is connected to the edge portion of the front cover 210. The first wiring cable 261 extends from the button assembly 250 to the rear, and the end of the extended first wiring cable 261 is connected to the camera body, i.e., a circuit board on the camera body (not shown).

The user interface module 200 is assembled with the camera body so as to form a digital camera, and is electrically connected to the camera body for functional cooperation. By connecting the user interface module 200, which mainly includes an image display unit and a user manipulation unit, to the camera body, the user interface module 200 may display a screen by receiving a suitable image signal from the camera body, and the camera body may perform a suitable operation or mode setting corresponding to a user input by receiving a manipulation signal of the user from the user interface module 200. Here, the first wiring cable 261 is prepared as interconnection that electrically connects the user interface module 200 and the camera body. Accordingly, since all input/output signals are relayed via one cable, an interconnection structure is simplified, and thus operation stability is increased.

Additionally, before being assembled with the camera body, the user interface module 200 may undergo a reliability test for selecting a functioning product and a malfunctioning product by analyzing electrical characteristics of the user interface module 200. For example, the user interface module 200 may be tested by inputting a predetermined touch signal to the touch panel 230 and then detecting an electric signal output from an unconnected terminal of the first wiring cable 261, thereby checking whether an input signal of the user is transmitted without error. Alternatively, the user interface module 200 may be tested by inputting a user's manipulation signal that is generated by manipulating the button pattern 255 and then detecting an output signal at the end of the first wiring cable 261 thereby checking whether a signal of the user is accurately transmitted. Alternatively, a defect of the touch panel 230 may be determined by applying a predetermined image signal to an unconnected terminal of the first wiring cable 261 and then checking a screen status displayed on the touch panel 230.

The user interface module and digital camera disclosed above have the advantage that such a series of testing processes may be performed before the user interface module 200 is assembled with the camera body, and thus a product that is determined to be malfunctioning may be replaced or repaired without the need to separate the product from the camera body. By not having to remove the malfunctioning product from the camera body, the possibility of damaging the camera body, an electrical interconnection between the malfunctioning product and a peripheral part, or the malfunctioning product may be avoided.

The disclosure of the user interface module and the digital camera above, have the advantage that an image display unit and a user manipulation unit that form a user interface module are modularized and manufactured as a unified part separated from a camera body. Accordingly, when a defect is found in the user interface module, the user interface module may be repaired or disused, regardless of the connection to the camera body, and thus operation convenience increases. Also, by relaying all input/output signals via one cable between the user interface module and the camera body, a wiring structure is simplified, and operation stability increases.

Additionally, by modularizing the image display unit and the user manipulation unit as a unified part separated from the camera body, assembly productivity of the camera increases. And when a part is found to be malfunctioning, the malfunctioning part may be replaced or repaired as part of the unified part regardless of how the malfunctioning part is electrically connected to other camera parts. Accordingly, the efficiency of reliability tests and maintenance operations are increased.

Additionally, by collecting and transmitting all input/output signals between the user interface module and the camera body via one wiring cable, a signal transmission system is simplified, and thus operation stability increases.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A user interface module for a digital camera, the user interface module comprising:
    a front cover including a window through which an image may be projected, and an attachment element to fixedly affix the user interface module to an exterior surface of a camera body;
    a touch panel disposed behind the front cover to project the image through the window, and detect touch manipulations of a user;
    a button assembly including a button pattern externally exposed through the front cover to detect and convert manipulations of the button pattern into an electrical signal;
    a flexible printed circuit board comprising a circuit that is configured to convert or process a touch signal generated by the touch panel and to convert physical manipulations of the button pattern into a manipulation signal;
    a first wiring cable connected between the flexible printed circuit board and the camera body to collect and transmit the touch signal of the touch panel and the manipulation signal of the button assembly to the camera body; and
    a second wiring cable that is connected between the flexible printed circuit board and the touch panel to relay the touch signal of the touch panel to the flexible printed circuit board,
    wherein the touch panel, the button assembly and the first wiring cable are assembled with the front cover prior to the user interface module being affixed to the exterior surface of the camera body via the attachment element.

2. The user interface module of claim 1, further comprising a transparent window panel, which covers the window of the front cover, disposed between the front cover and the touch panel.

3. The user interface module of claim 2, wherein the button assembly is attached to an edge portion of the window panel with an adhesive film.

4. The user interface module of claim 1, wherein the button assembly further comprises a rubber mold elastically biasing the button pattern toward the user.

5. The user interface module of claim 4, wherein the button assembly further comprises a front holder plate and a rear holder plate combined to each other, wherein the button pattern and the rubber mold are disposed between the front holder plate and the rear holder plate.

6. A digital camera comprising:
    a camera body configured to capture an image of a subject and generate data representing the image; and
    a user interface module including:
    a front cover defining an external appearance of the digital camera and including a window through which an image may be projected, and an attachment element to fixedly affix the user interface module to an exterior surface of the camera body;
    a touch panel disposed behind the front cover to project the image through the window, and detect touch manipulations of a user;
    a button assembly including a button pattern externally exposed through the front cover to detect and convert manipulations of the button pattern into an electrical signal;
    a flexible printed circuit board comprising a circuit that is configured to convert or process a touch signal generated by the touch panel and to convert physical manipulations of the button pattern into a manipulation signal;
    a first wiring cable connected between the flexible printed circuit board and the camera body to collect and transmit the touch signal of the touch panel and the manipulation signal of the button assembly to the camera body; and
    a second wiring cable connected between the flexible printed circuit board and the touch panel to relay the touch signal of the touch panel to the flexible printed circuit board,
    wherein the touch panel, the button assembly and the first wiring cable are assembled with the front cover prior to the user interface module being affixed to the exterior surface of the camera body via the attachment element.

7. The digital camera of claim 6, wherein the button assembly further includes:
    a rubber mold that elastically biases the button pattern toward the user;
    a front holder plate and a rear holder plate, the button pattern, the rubber mold, and the flexible printed circuit board being disposed between the front holder and the rear holder plate.

8. The digital camera of claim 6, further comprising a transparent window panel covering the window of the front cover and interposed between the front cover and the touch panel.

9. The digital camera of claim 8, wherein the button assembly is attached to an edge portion of the window panel with an adhesive film.

10. A user interface module for a digital camera, the user interface module comprising:
a front cover including a window through which an image may be projected, and an attachment element to fixedly affix the user interface module to an exterior surface of a camera body;
a touch panel disposed behind the front cover to project the image through the window, and detect touch manipulations of a user;
a button assembly including a button pattern externally exposed through the front cover to detect and convert manipulations of the button pattern into an electrical signal;
a flexible printed circuit board comprising a circuit that is configured to convert or process a touch signal generated by the touch panel and to convert physical manipulations of the button pattern into a manipulation signal;
a first wiring cable that is connected between the flexible printed circuit board and the camera body to relay all input/output signals between the user interface module and the camera body and transmits the touch signal of the touch panel and the manipulation signal of the button assembly to the camera body; and
a second wiring cable connected between the flexible printed circuit board and the touch panel to relay the touch signal of the touch panel to the flexible printed circuit board,
wherein the touch panel, the button assembly and the single wiring cable are assembled with the front cover prior to the user interface module being affixed to the exterior surface of the camera body via the attachment element.

* * * * *